United States Patent [19]

Hwang

[11] 4,023,141
[45] May 10, 1977

[54] EFFICIENT ONE-SIDED REARRANGEABLE MULTISTAGE SWITCHING NETWORK

[75] Inventor: Frank Kwangming Hwang, Piscataway Township, Middlesex County, N.J.

[73] Assignee: Bell Telephone Laboratories, Incorporated, Murray Hill, N.J.

[22] Filed: June 1, 1976

[21] Appl. No.: 691,899

[52] U.S. Cl. .................... 340/166 R; 179/18 GF; 179/18 EA
[51] Int. Cl.[2] ............... H04J 3/00; H04Q 3/68; H04M 3/36
[58] Field of Search ....... 340/166 R, 147 C, 147 R; 179/18 GF, 18 J, 18 FH, 18 EA

[56] References Cited

UNITED STATES PATENTS

| | | | |
|---|---|---|---|
| 3,129,407 | 4/1964 | Paull | 340/147 R |
| 3,317,897 | 5/1967 | Ceonzo et al. | 179/18 GF |
| 3,358,269 | 12/1967 | Benes | 340/166 R |
| 3,458,658 | 7/1969 | Aro | 179/18 J |
| 3,638,193 | 1/1972 | Opferman et al. | 179/18 GF |
| 3,727,006 | 4/1973 | Jacob | 179/18 J |
| 3,906,175 | 9/1975 | Joel, Jr. | 179/18 GF |
| 3,920,923 | 11/1975 | Schonemeyer | 179/18 GF |
| 3,980,834 | 9/1976 | Akiyama et al. | 179/18 GF |

Primary Examiner—Donald J. Yusko
Attorney, Agent, or Firm—Robert O. Nimtz

[57] ABSTRACT

Disclosed is a one-sided rearrangeable connecting network employing fewer elemental switches, or crosspoints, than prior art networks of corresponding capability. In a three stage embodiment of this invention, the first stage comprises $n$ input-mixed rearrangeable switches connected to input terminals, the second stage comprises $n$ one-sided rearrangeable switches connected to the input-mixed switches of the first stage and $n/2$ two-sided rearrangeable switches interconnecting pairs of the one-sided rearrangeable switches of the second stage, and the third stage comprises $n$ output-mixed rearrangeable switches connected to the one sided switches of the second stage and to output terminals.

6 Claims, 4 Drawing Figures

4,023,141

EFFICIENT ONE-SIDED REARRANGEABLE MULTISTAGE SWITCHING NETWORK

FIELD OF THE INVENTION

This invention relates to switching networks and, more particularly, to rearrangeable switching networks.

BACKGROUND OF THE INVENTION

General

Switching systems such as the telephone switching network are generally designed to interconnect, upon request selected pairs of customer terminals from a large plurality of terminals connected to the system. The simplest connecting network capable of such interconnections is a single switching matrix designed to connect any idle customer terminal to any other idle terminals in the network, regardless of whether all other terminals in the network are interconnected therein.

To achieve this capability with a single switching matrix it is necessary to employ a number of elemental switches, or crosspoints, within the matrix which increases as the square of the number of customer terminals served by the network. This may result in matrices having prohibitively large numbers of crosspoints.

Fortunately it is not necessary to employ such a capable switching network because advantage can be taken of the theory of trunking probability which recognizes that seldom are more than 10 percent of the terminals active at any particular time. In view of this theory of trunking probability, it is possible, and economically advantageous, to use a less capable switching network.

One such less capable switching arrangement is realized with a multistage connecting network which comprises an ordered plurality of $s$ interconnected stages ($v_i$). In such a multistage network, each stage $v_i$ includes a plurality of switches $v_{i1}, v_{i2} \ldots v_{ir_i}$ having input and output links. The input links of each switch in a stage are respectively connected to the output links of switches in the preceding stage while the output links of each switch in a stage are respectively connected to the input links of switches in the succeeding stage. The input links of the first stage switches are connected to customer terminals termed input terminals, and the output links of the last stage switches are connected to customer terminals termed output terminals. For purposes of the instant specification, it is assumed that each first stage switch, $v_{1j}$, has $n$ input links, that each last stage switch, $v_{sj}$, has $n$ output links, that there are $n$ input switches ($r_1=n$) and that there are $n$ output switches ($r_s=n$). Additionally, only a three-stage network ($s=3$) is described herein, although it is to be understood that the disclosed invention is applicable to any value of $s$.

The words "input" and "output" of phrases "input terminals" and "output terminals" refer, of course, to the arbitrary input and output designations of the switching network. Each "input" or "output" terminal can in fact be the calling or the called party of an interconnection request. In a telephone system, for example, the input terminals may be the telephones of one central office while the output terminals may be the telephones of another central office.

As implied above, it is possible for a customer terminal connected to a multistage switching network to be blocked from being connected as desired, if the network happens to be interconnected in a manner that prevents effecting the desired interconnection. This, of course, is an undesirable situation which in an appropriately designed network can be remedied by dismantling existing interconnections and by rearranging the interconnectionpaths to accommodate the new request. When such a rearrangement is possible, it is said that the new assignment, which is the new set of interconnections desired to be established, is realizable. A network which can realize all possible assignments without rearranging existing connections is said to be nonblocking, while a network which can realize all possible assignments only by occasionally rearranging existing connections is said to be merely rearrangeable.

A network is said to be one-sided rearrangeable if it can realize all assignments which interconnect input terminals to all other input terminals, input terminals to output terminals and vice versa, and output terminals to all other output terminals.

A network is said to be two-sided rearrangeable if input terminals can only connect to output terminals (and vice versa).

A network is said to be input-mixed rearrangeable if input terminals can be connected to other input terminals or to output terminals, but output terminals cannot connect to other output terminals. Similarly, a network is said to be output-mixed rearrangeable if output terminals can connect to other output terminals or to input terminals, but input terminals cannot connect to other input terminals.

The above definitions of one-sided rearrangeability, two-sided rearrangeability, input-mixed rearrangeability and output-mixed rearrangeability can be applied to a switch $v_{ij}$ in the same manner as applied to a network.

Prior Art

FIG. 1 illustrates a prior art three-stage input-mixed rearrangeable network. It comprises stages $v_1$ (element 10), $v_2$ (element 20) and $v_3$ (element 30). Stage $v_1$, in turn, comprises $r_1$ input-mixed rearrangeable switches $v_{11}, v_{12} \ldots v_{1r_1}$, stage $v_2$ comprises $r_2$ one-sided rearrangeable switches $v_{21}, v_{22} \ldots v_{2r_2}$, and stage $v_3$ comprises $r_3$ output-mixed rearrangeable switches $v_{31}, v_{32} \ldots v_{3r_3}$. As indicated above, $r_1=n$, $r_3=n$, switches $v_{1j}$ have $n$ input links each and, similarly, switches $v_{3j}$ have $n$ input links each. Since one output link of each $v_{1j}$ switch is connected to an input link of each $v_{2j}$ switch, and since there are $r_2$ second stage switches, each $v_{1j}$ switch must have $r_2$ output links. For corresponding reasons, each $v_{3j}$ switch has $r_2$ input links while each $v_{2j}$ switch has $r_1$ (equal to $n$) input links and $r_3$ (equal to $n$) output links. Because the $v_{2j}$ switches are one-sided rearrangeable, the distinction between input and output links need not be maintained. It may be said, therefore, that the $v_{2j}$ switches have $2n$ input/outpus links (I/O links).

To help in ascertaining the number of crosspoints required for each particular type of switch, switches $v_{11}$ and $v_{21}$ are illustrated in FIG. 1 with the prior art internal arrangement of elemental switches, or crosspoints, within each type of switch. Modeled after the switch arrangements shown in "Mathematical Theory of Connecting Networks for Telephone Logic" by V. E. Benes, Academic Press, 1965, Chap. 4, FIGS. 9 and 10, the one-sided rearrangeable switch $v_{21}$ is depicted as a triangular switch with each I/O link connected to a bus line that intersects bus lines connected to the other I/O links of the switch. The intersections of all of the bus lines are connected with normally open elemental switches such as switch 103, and the closure of those crosspoints effectuate the desired interconnection. It can mathematically be shown, as well as seen from the drawing of FIG. 1, that the triangular switch $v_{21}$ is nonblocking, i.e., any I/O link may be connected to any idle I/O link in the switch by the closure of a single crosspoint, irrespective of whether the other I/O links are connected. It can also be seen that in a $v_{21}$ type switch having $x$ input links and $y$ output links, the number of elemental switches, or crosspoints, required to implement the switch is equal to $(x+y)(x+y-1)/2$ or approximately $(x+y)^2/2$.

Also in accordance with the above mentioned Benes book, the input-mixed rearrangeable switch $v_{11}$ is depicted as a trapezoidal switch. It may be viewed as a triangular switch section $v_{11}'$, which connects any input link of switch $v_{11}$, and a square switch section $v_{11}''$ which connects input links of $v_{11}$ to output links of $v_{11}$. The square switch section $v_{11}''$ function is achieved by connecting each input link of $v_{11}$ to a bus line, e.g., 104, and each output link of $v_{11}$ to a bus line, e.g., 105. The input link bus lines are arranged so that each input link busline intersects all output bus lines, and the intersecting bus lines are interconnected with normally open elemental switches such as switch 106. It can be shown that the trapezoidal switch $v_{11}$ is nonblocking in the same sense that the triangular switch $v_{21}$ is nonblocking.

From the above it can be seen that the number of crosspoints required for the square switch section of the $v_{11}$ type switch (for $x$ input links and $y$ output links) is equal to $xy$, and that the total number of crosspoints required for the $v_{11}$ type switch is $(x)(x-1)/2+xy$, or approximately $(x^2/2)+xy$. Of course, it should be noted that the output-mixed rearrangeable switches of stage $v_3$ are of the same construction as the input-mixed rearrangeable switches of stage $v_1$. The stage $v_3$ switches are drawn in FIG. 1 as mirror images of the stage $v_1$ switches because the output links of $v_3$ are on the right side whereas the input links of $v_1$ are on the left side.

Since the stage $v_1$ and $v_3$ switches are rearrangeable (and nonblocking), any input terminal may be connected to any other terminal if a sufficient number of stage $v_2$ switches are made available, i.e., if $r_2$ is large enough to accommodate all input terminal/output terminal connections employing a particular $v_2$ switch, plus whatever input terminal/input terminal (and output terminal/output terminal) connections may need to be made through the same particular $v_2$ switch (e.g., connection between input (output) terminals associated with different $v_1$ ($v_2$) switches). It can be shown that for the network of FIG. 1 to be rearrangeable, $r_2$ must at least be equal to the integer part of $3n/2$, which for large values of $n$ is essentially equal to $3n/2$. Calculating the total number of crosspoints required for the network of FIG. 1 results in stages $v_1$ and $v_3$ requiring $n(n^2/2+n3n/2)$, or $2n^3$ crosspoints each, and stage $v_2$ requiring $3n/2(4n/2)$, or $3n^3$ crosspoints, for a total of $7n^3$ crosspoints.

SUMMARY OF THE INVENTION

It is an object of this invention to construct a one-sided rearrangeable network which has a number of crosspoints lower than the number of crosspoints required for the above prior art network.

This object, among others, is realized with a three stage one-sided rearrangeable switching network having input-mixed rearrangeable switches in the first switching stage, output-mixed rearrangeable switches in the third switching stage, and interconnected one-sided rearrangeable switches in the second switching stage. The interconnection of the one-sided switches in the second stage is accomplished by pairing off the switches and by interconnecting each pair with an auxiliary two-sided rearrangeable switch. Specifically, the I/O links of the first one-sided switch in a pair are connected to the input links of an associated auxiliary switch, and the output links of the associated auxiliary switch are connected to the I/O links of the second one-sided rearrangeable switch in the pair.

DETAILED DESCRIPTION

Figure 1:
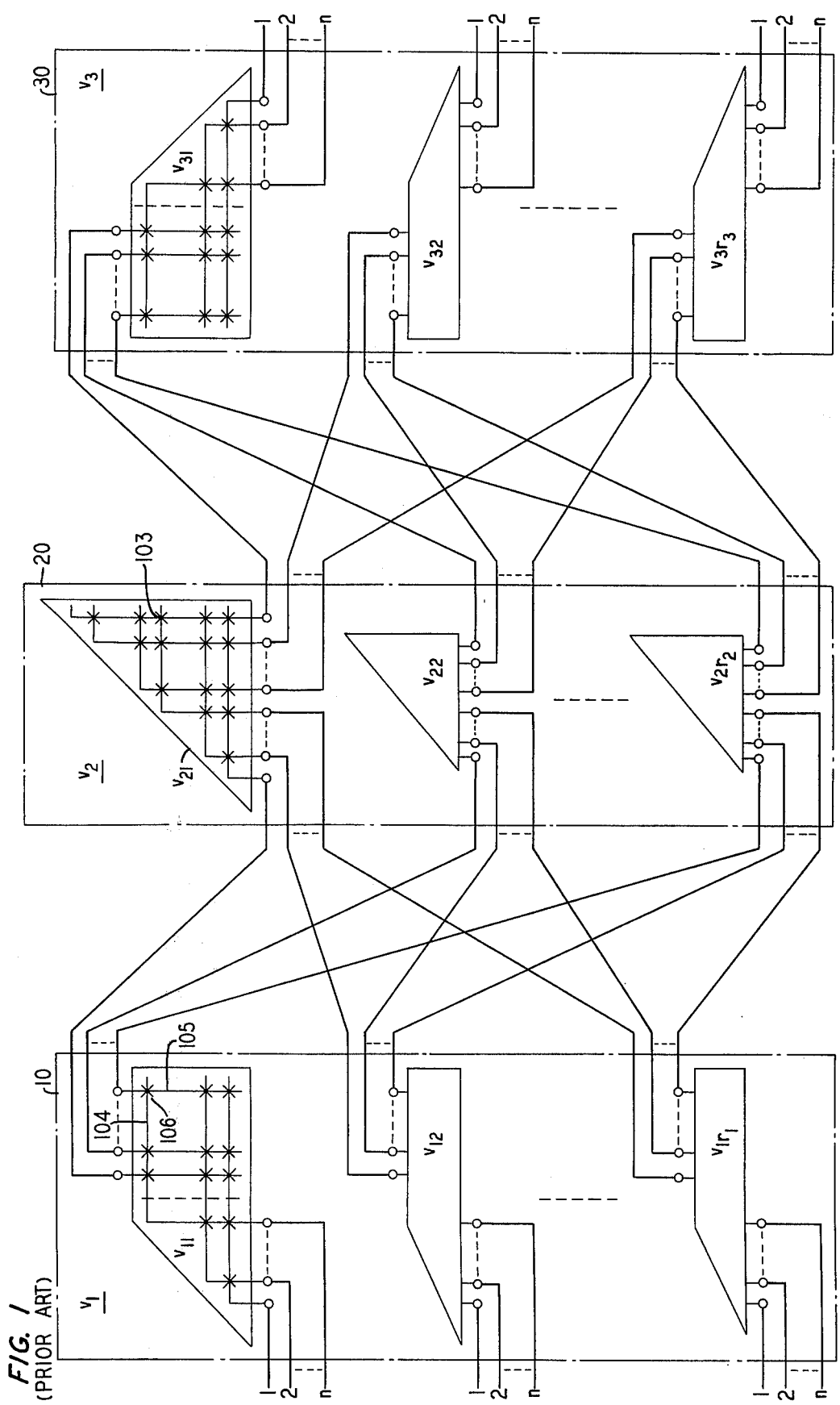
FIG. 1 depicts a block diagram of a prior art configuration for a one-sided rearrangeable multistage switching network.

FIG. 1 depicts a block diagram of a prior art one-sided rearrangeable network which was, in the interest of simplicity, limited to three stages. To make the FIG. 1 network operate, however, a control section must be employed which would maintain the necessary data related to the existing assignment and which would be capable of altering the assignment of the FIG. 1 network in response to additional interconnection requests. This control section is not illustrated in FIG. 1 because it relates only peripherally to the subject matter of this invention, and inclusion thereof, it is believed, would only confuse the issue.

Figure 2:
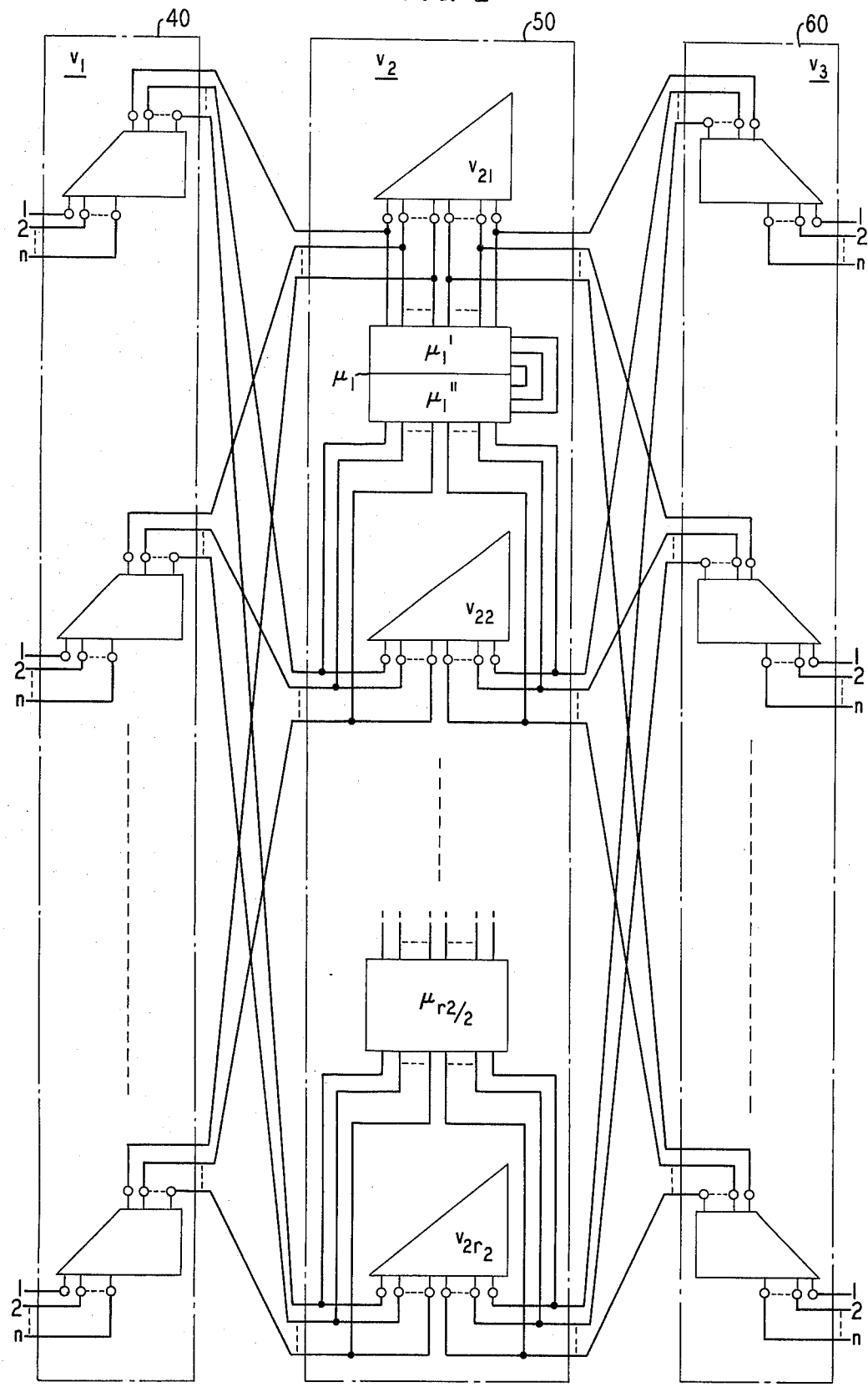
FIG. 2 depicts a block diagram of a one-sided rearrangeable multistage switching network in accordance with the principles of this invention.

For similar reasons, FIG. 2, which presents the block diagram of a three stage one-sided rearrangeable network in accordance with the principles of this invention, also does not illustrate the control section associated with the network. It is noted, however, that a number of known controllers are suitable for use with the networks of FIGS. 1 and 2 and that whatever control section is employed in conjunction with the network of FIG. 1 may also be employed in conjunction with the network of FIG. 2. For those interested, reference is made to a control section described by M. C. Paull in U.S. Pat. No. 3,129,407 issued Apr. 14, 1964.

As illustrated, FIG. 2 comprises a first switching stage, 40, designated $v_1$, a second switching stage, 50, designated $v_2$, and a third switching stage, 60, designated $v_3$. Each switching stage $v_i$ contains an $r_i$ plurality of switches $v_{ij}$ $j=1, 2 \ldots r_i$ and each $v_{ij}$ switch contains input links and output links. As in the network of FIG. 1, there are $n$ input-mixed rearrangeable switches in stage $v_1$, each having $n$ input and $r_2$ output links respectively connected to $r_2$ switches in $v_2$, and $n$ output-mixed rearrangeable switches in stage $v_3$, each having $n$ output and $r_2$ input links respectively connected to the $r_2$ switches in $v_2$. Also as in the network of FIG. 1, stage $v_2$ has $r_2$ one-sided rearrangeable switches each having $2n$ I/O links respectively connected to stages $v_1$ and $v_3$.

The FIG. 2 network differs from the FIG. 1 network in that the number of stage $v_2$ switches, $r_2$, is only equal to $n$, rather than $3n/2$, and in that a number of auxiliary interconnecting switches are introduced into the stage $v_2$ of FIG. 2. The purpose, construction, and the interconnections of those auxiliary switches will become apparent when the reason for the FIG. 1 requirement of $v_2$ being equal to $3n/2$ is more fully appreciated from the discussion below.

Figure 3:
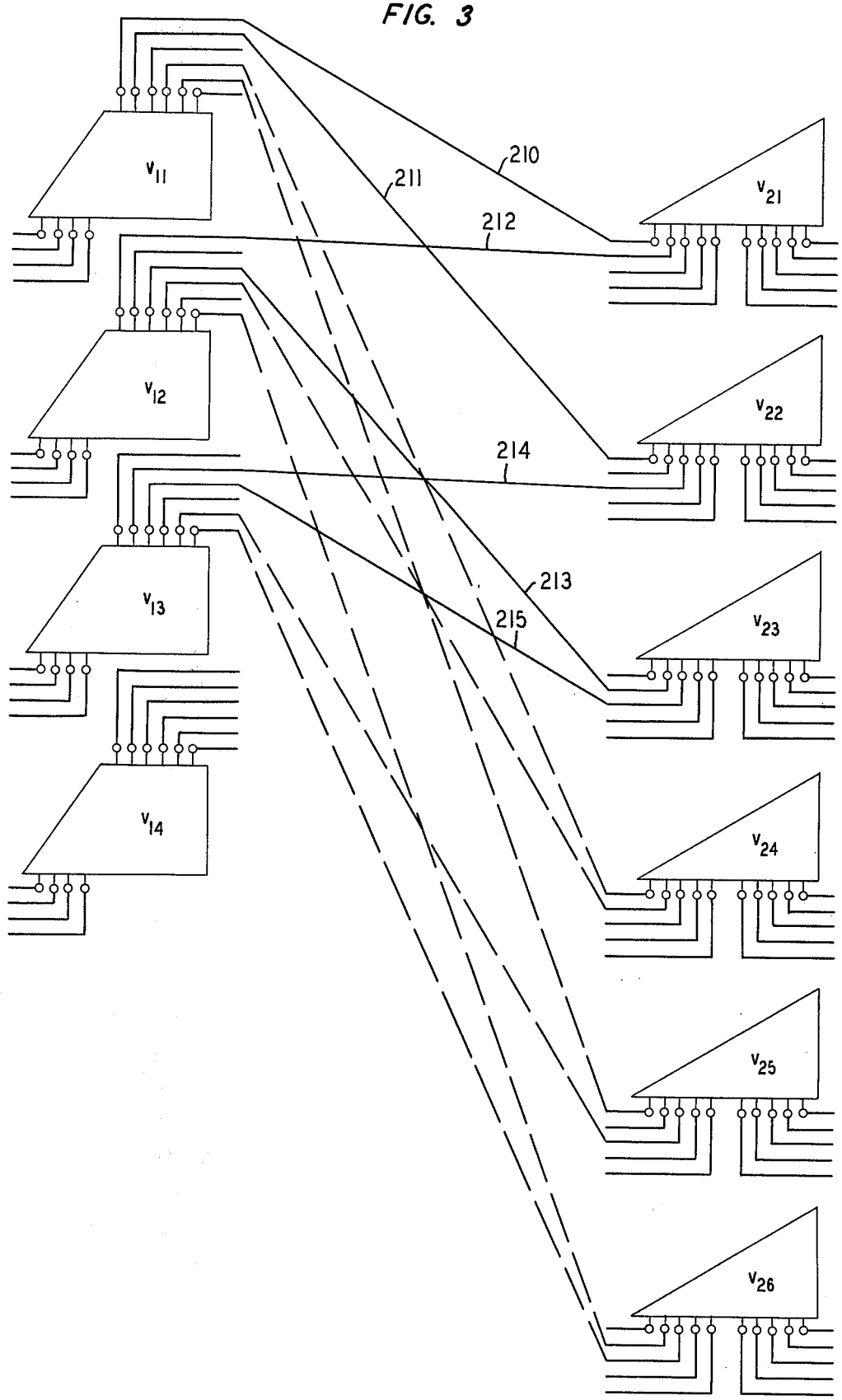
FIG. 3 describes the second stage interconnection requirements associated with a circular interconnection assignment in a FIG. 1 network.

In general, any stage $v_2$ switch may be employed to interconnect more than one pair of I/O links. An unusual situation occurs, however, when a desired assignment includes a circular assignment, as for example, $\{(I_1,I_2), (I_2,I_3), (I_3,I_1)\}$ where $I_1$, $I_2$, and $I_3$ represent an input terminal connected to $v_{11}$, $v_{12}$ and $v_{13}$, respectively. FIG. 3 illustrates such an assignment for a FIG. 1 switching network with $n=4$ and shows that three stage $v_2$ switches must be employed to implement the above circular assignment. This is shown with solid lines 210, 211, 212, 213, 214 and 215. From FIG. 3 it can also be seen that in order to connect the other two terminals associated with switch $v_{11}$ to terminals associated with switches $v_{12}$ and $v_{13}$, three additional stage $v_2$ switches are necessary. Thus, it appears that for $n=4$, $r_2$ must equal 6, or $3n/2$.

I have discovered that but for the circular assignments as described above, the value of $r_2$ would need only be equal to $n$ to make the network of FIG. 2 rearrangeable. Therefore, in accordance with the principles of this invention, the number of stage $v_2$ switches is permitted to be as low as $n$ ($r_2 \geq n$) and the circular assignments implemented with auxiliary switches. Actually, since two interconnections of each circular assignment can be implemented by a pair of stage $v_2$ triangular switches, the auxiliary switches need only implement the third interconnection in each circular assignment.

In FIG. 2, the auxiliary switches are depicted in FIG. 2 with blocks $\mu_1 \ldots \mu_{r_2/2}$. To interconnect the auxiliary switches, stage $v_2$ switches, $v_{2j}$, are grouped in pairs (which, conveniently, may be grouped into pairs of adjacent switches $v_{2,2i-1}$ and $v_{2,2i}$ ($i=1, 2 \ldots n/2$) and each pair of switches is interconnected with an auxiliary two-sided rearrangeable switch $\mu_i$. That is, the $2n$ I/O links of each switch $v_{2,2i-1}$ are connected to the $2n$ input links of a two-sided rearrangeable switch $\mu_i$, and the $2n$ I/O links of each switch $v_{2,2i}$ are connected to the $2n$ output links of switch $\mu_i$. Again, since only one out of three possible interconnections needs to be implemented by any switch $\mu_i$, each two-sided $\mu_i$ switch may advantageously comprise a cascade of two two-sided rearrangeable switches with one switch, $\mu_i'$, having $2n$ input links and $2n/3$ output links and the other switch, $\mu_i''$, having $2n/3$ output links (connected to the $2n/3$ input links of $\mu_i'$) and $2n$ output links. This is shown diagrammatically within switch $\mu_1$ of FIG. 2.

Computing the crosspoint count of individual switches, it can be seen that the number of crosspoints in stages $v_1$ and $v_3$ (having input-mixed and output-mixed switches) is $$n\left(\frac{n^2}{2}+n^2\right)$$

or $3n^3/2$ crosspoints in each stage, the number of crosspoints in stage $v_2$ (having triangular switches) is $$n\left(\frac{4n^2}{2}\right),$$

and the number of crosspoints in switches $\mu_i$ is $$\frac{n}{2}\left(2\frac{4n^2}{3}\right),$$

for a total of $$\frac{19}{3}n^3$$

crosspoints (as compared to $7n^3$ for the network of FIG. 1).

Another reduction in the crosspoint count may be achieved when it is realized that if more than one switch is permitted to be closed for any particular interconnection, and if a two-sided rearrangeable switch has a number of output links that is at least equal to the number of its input links, then such a two-sided rearrangeable switch can also serve as an input-mixed rearrangeable switch. This can easily be shown when it is realized that an input-mixed assignment can be decomposed into two two-sided assignments which may be connected to the same output link bus by the closure of two crosspoints. If this simplification is employed in the network of FIG. 2, the input-mixed rearrangeable and the output-mixed rearrangeable switches of stages $v_1$ and $v_3$, respectively, can be replaced with two-sided rearrangeable switches, reducing thereby the crosspoint count of the FIG. 2 network to $$\frac{16}{3}n^3$$

crosspoints.

EXAMPLE

The following example is presented to illustrate the rearrangeability property of the FIG. 2 circuit.

Consider the assignment:

$\{(I_{11},I_{13})(I_{22},I_{31})(I_{21},I_{42})(I_{14},O_{13})(I_{12},O_{23})(I_{32},I_{41})$
$(I_{33},O_{31})(I_{34},O_{12})(I_{44},O_{43})(O_{21},O_{41})(O_{14},O_{22})(O_{32},O_{34})\}$ where $I_{ij}$ designates the $j^{th}$ input terminal in the $i^{th}$ switch of stage $v_1$, where $O_{ij}$ designates the $j^{th}$ output terminal in the $i^{th}$ switch of stage $v_3$ and where the two terminals within each parenthesized expression signify a desired interconnection.

Figure 4:
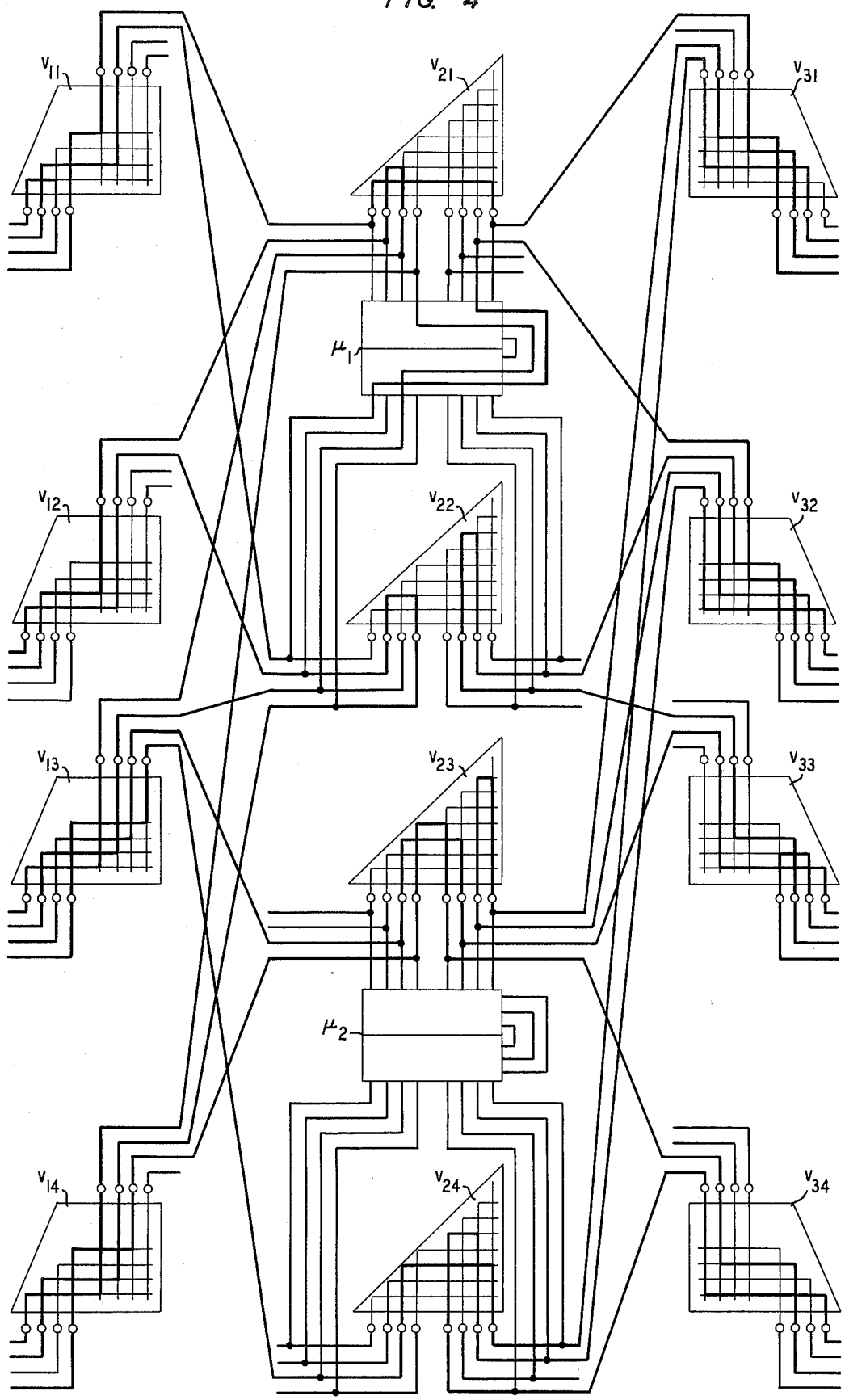
FIG. 4 illustrates the interconnection paths of the FIG. 2 network arranged to implement a selected assignment.

FIG. 4 shows the interconnection of the above assignment in a switching network in accordance with the principles of this invention with $n=4$ and $r_2=4$. The interconnections of FIG. 4 were derived by proceeding in accordance with the following method:

1. Any interconnection consisting of two customer terminals connected to the same switch (input or output) are interconnected within the switch. In the above example, interconnections $(I_{11},I_{13})$ and $(O_{32},O_{34})$ fall into this category. These interconnections are depicted in FIG. 4 within switches $v_{11}$ and $v_{33}$, respectively.

2. Remaining interconnection pairs are partitioned into $n/2$ groups, subject to the condition that terminals associated with a particular switch of stage $v_1$ or stage $v_3$ appear within a group no more than twice. For example, $I_{11}$, $I_{12}$ and $I_{14}$ relate to switch $v_{11}$ and therefore only two of them are permitted to be included in any one group. Such partitioning is always possible since there are $n$ input terminals associated with stage $v_1$ switches and $n$ output terminals associated with stage $v_3$ switches. A mathematical analysis proving that such partitioning is always possible is presented by J. Peterson in "Die Theorie Der Regularen Graphen," *Acta. Math.* 15 (1891), 193–220.

In the above example, $n=4$ and the two groups arbitrarily chosen are:

$$G_1 = \{(I_{22},I_{31}),(I_{21},I_{42}),(I_{14},O_{13}),(I_{12},O_{23}),(I_{32},I_{41})\}$$
$$G_2 = \{(I_{33},O_{31}),(I_{34},O_{12}),(I_{41},O_{43}),(O_{21},O_{41}),(O_{14},O_{22})\}.$$

3. Each group is partitioned into three subgroups such that no switch is repeated within a subgroup. This is always possible because each switch appears at most twice in ech group. In the above example, the subgroups chosen are $$G_{11} = [(I_{22},I_{32}),(Ihd\ 14,O_{13})]$$
$$G_{12} = [(I_{21},I_{42})]$$
$$G_{13} = [(I_{12},O_{23}),(I_{32},I_{41})]$$

and $$G_{21} = [(I_{33},O_{31}),(I_{44},O_{43}),(O_{14},O_{14},O_{22})]$$
$$G_{22} = [(I_{34},O_{12}),(O_{21},O_{41})]$$
$$G_{23} = \text{empty}.$$

4. Each subgroup $G_{i1}$ assignment is implemented with switch $v_{2,2i-1}$, subgroup $G_{i2}$ assignment is implemented with switch $v_{2,2i}$ and subgroup $G_{i3}$ assignment is implemented with switch $\mu_i$. In the above example, groups $G_{11}$, $G_{12}$, $G_{13}$, $G_{21}$, and $G_{22}$ are implemented with switches $v_{21}$, $v_{22}$, $\mu_1$, $v_{23}$, and $v_{24}$, respectively. Switch $\mu_2$ is not employed because subgroup $G_{23}$ is empty.

A perusal of FIG. 4 reveals that switch $v_{23}$ is employed by all four stage $v_3$ switches. It appears, therefore, that no additional interconnections to output terminals can be made in group $G_2$ since they would necessarily involve the output links of switch $v_{23}$. That is not a calamity because an additional connection involving output terminals, such as $(O_{24},O_{33})$, need not be placed in group $G_2$. In the above example, the additional interconnection above may be placed in group $G_1$, subgroup $G_{12}$, and may be implemented with switch $v_{22}$ as depicted in FIG. 4. Alternatively, this interconnection could be placed in subgroup $G_{13}$ and implemented with switch $\mu_1$.

It should be noted that the embodiments illustrated and described herein are merely illustrative of the principles of this invention and should not be construed as fully depicting my invention. Particularly, it should be realized that the various simplifications introduced into the description were so introduced only to simplify the drawing and to make the discussion more concise. For example, the circuit of FIG. 2 can be implemented with any number of input and output terminals and with any number of stages. Also, any input-mixed one-sided or two-sided switch can be decomposed into a three stage network composed of smaller switches.

What is claimed is:

1. A multistage switching network subdivided into a first stage, a second stage and a third stage characterized in that:

said first stage comprises an $n$ plurality of input-mixed rearrangeable switches;

said second stage comprises an $n$ plurality of one-sided rearrangeable switches and an $n/2$ plurality of two-sided rearrangeable switches; and said third stage comprises an $n$ plurality of output-mixed rearrangeable switches.

2. A multistage switching network having a first stage, a second stage connected to said first stage and a third stage connected to said second stage characterized in that said first stage comprises an $n$ plurality of input-mixed rearrangeable switches;

said second stage comprises an $n$ plurality of one-sided rearrangeable switches and an $n/2$ plurality of two-sided rearrangeable switches; and said third stage comprises an $n$ plurality of output-mixed rearrangeable switches.

3. A three stage one-sided rearrangeable switching network comprising $n$ input-mixed rearrangeable switches associated with the first stage of said network and connected to input terminals, one-sided rearrangeable switches associated with the second stage of said network and connected to said first stage and output-mixed rearrangeable switches associated with the third stage of said network and connected to said second stage and to output terminals characterized in that:

said second stage comprises no more than $n$ of said one-sided rearrangeable switches each having $2n$ input/output (I/O) links and further comprises a plurality of two-sided rearrangeable switches having input and output links that interconnect pairs of said one-sided rearrangeable switches.

4. The switching network of claim 3 wherein said second stage includes an $n/2$ plurality of said two-sided rearrangeable switches each having $2n$ of said input links and $2n$ of said output links.

5. The switching network of claim 4 wherein said $2n$ input links of each of said two-sided rearrangeable switches are connected to said $2n$ I/O links of one of said one-sided rearrangeable switches in said pairs and said $2n$ output links of each of said two-sided rearrangeable switches are connected to the $2n$ I/O links of the other of said one-sided rearrangeable switches in said pairs.

6. The switching network of claim 5 wherein each of said two-sided rearrangeable switches comprises:

a first two-sided rearrangeable switch having two input links and $2n/3$ output links; and a second two-sided rearrangeable switch having $2n$ output links and $2n/3$ input links connected to said $2n/3$ output links of said first two-sided rearrangeable switch.

* * * * *